United States Patent [19]

Nomura et al.

[11] Patent Number: 5,289,280
[45] Date of Patent: Feb. 22, 1994

[54] VISUAL AND/OR AUDIO INFORMATION STORAGE AND RETRIEVAL DEVICE

[75] Inventors: Kenji Nomura; Tsunetaka Kusumoto, both of Tokyo, Japan

[73] Assignees: Nippon RB Development Inc.; Pioneer Electronic Corp., both of Tokyo, Japan

[21] Appl. No.: 862,358

[22] Filed: Apr. 2, 1992

[30] Foreign Application Priority Data

Apr. 3, 1991 [JP] Japan ................................ 3-099412

[51] Int. Cl.$^5$ ............................................. H04N 5/14
[52] U.S. Cl. .................................. 348/571; 358/335; 348/143; 348/96
[58] Field of Search ............... 358/160, 142, 143, 903, 358/335, 310, 108, 434, 343, 332, 102, 345; 360/33.1, 35.1

[56] References Cited

U.S. PATENT DOCUMENTS

| | | | |
|---|---|---|---|
| 4,511,886 | 4/1985 | Rodriguez | 358/108 |
| 4,641,203 | 2/1987 | Miller | 358/335 |
| 4,703,347 | 10/1987 | Yasuda | 358/102 |
| 4,821,118 | 4/1989 | Lafreniere | 358/108 |
| 4,894,717 | 1/1990 | Komei | 358/108 |

OTHER PUBLICATIONS

Explanatory Leaflet distributed in Japan on Oct. 1, 1991 with partial translation.

*Primary Examiner*—James J. Groody
*Assistant Examiner*—Sherrie Hsai
*Attorney, Agent, or Firm*—Armstrong, Westerman, Hattori, McLeland & Naughton

[57] ABSTRACT

A monument information storage and output device for outputting monument information consisting of registered picture and sound data which comprises a monument data intake system including a video imaging device or photographing device for inputting video information and/or a microphone or other sound pickup device for inputting sound information and a registration code input device for entering a registration code, a monument data storage system for storing the monument data transmitted from the monument data intake system by registration code, a data processing system for controlling the input and output of the monument data stored by registration code in the monument data storage system, and an output system for referring to the registration code and outputting the monument data corresponding to the particular code. The device is particularly suited for recording and outputting of information relating to beauty spots and other places for souvenir's sake.

8 Claims, 3 Drawing Sheets

VISUAL AND/OR AUDIO INFORMATION STORAGE AND RETRIEVAL DEVICE

FIELD OF THE INVENTION

The present invention relates to a monument information storage and output device adapted to store the video information or/and sound information recorded for souvenir purposes on an occasion such as a sightseeing tour as a data package and output the same video or/and sound information on demand on a later occasion.

BACKGROUND OF THE INVENTION

The recent progress of computer technology is literally amazing. In the realm of hardware, the hitherto-undreamed-of high speed mathematical operation and large memory capacity have been implemented in the aftermath of a great tide of improvements in operational elements and memory elements. Particularly in the field of memory media, the early magnetic cores were replaced by semiconductor integrated circuits which are now being superseded by light elements in many applications. Advances in software are not less remarkable. Thus, ordinary computation and data processing have by now become routines and time-sharing processing backed by large memory data, such as for booking of tickets, has already been materialized.

It has also been made possible to process picture data as image data. Such a system scans a picture, inputs and stores brightness data at junctions of high-density horizontal and vertical scanning lines as digital data, searches for required data on demand and reconstructs the picture as an output. This is another technology implemented as large memory became a reality.

As such an image processing technique, there is known an image transmission system which is now a commonplace artifact closely associated with many industrial and personal activities today. Though not requiring any extraordinarily large memory, this system scans an original picture, transforms its graded pattern of shade into electrical signals and outputs them for reconstruction of the original picture at a remote receiving device. This technology is similar to the above-mentioned image processing system in that picture images are once converted to digital signals.

Regarding the storage of large volumes of documents, these are generally microfilmed and filed but research has been undertaken into a system for scanning such documents as pictures, transforming them into digital signals for storage and retrieving stored digital signals for output of picture images.

As a device emphasizing the output of a picture image, there is known the so-called karaoke device utilizing an opticomagnetic disk. This device is also worth attention in that a huge mass of video information has been accommodated in a compact disk.

As a unit technology, it is already an established procedure to transform a large number of picture elements constituting a drawing, a photograph or a document into electrical signals, store them as a package and gives an output in the form of a reconstructed picture image. By using such technologies in combination, a variety of applications can be implemented.

As a typical example, a computer-aided filing system can be mentioned. However, the filing system is adapted mainly for document search and accessible by limited persons concerned but cannot be utilized by a large number of indefinite persons. Particularly the system cannot output different data for a large number of users at any one time. This is also true with other image processing systems.

OBJECT AND SUMMARY OF THE INVENTION

It is, thus, an object of the invention to provide a device which processes and stores a monument information consisting of picture data or/and sound data, which a user wants to preserve, through a computer and outputs the monument information instantly on demand on a later occasion.

The monument information storage and output device according to the present invention comprises a monument data intake (input) system 1 including a photographing means for outputting picture image information and/or a sound pickup means for outputting sound information and a registration code input means for entering a registration code, a monument data storage system 2 for storing the monument data transmitted from said monument data intake system 1 by registration code, a data processing system 3 for controlling the input and output of the monument data stored by registration code in said monument data storage system 2, and an output system 4 for referring to said registration code and outputting the monument data corresponding to the particular code.

DETAILED DESCRIPTION OF THE INVENTION

The invention is now described below in detail referring to FIG. 1.

Figure 1:
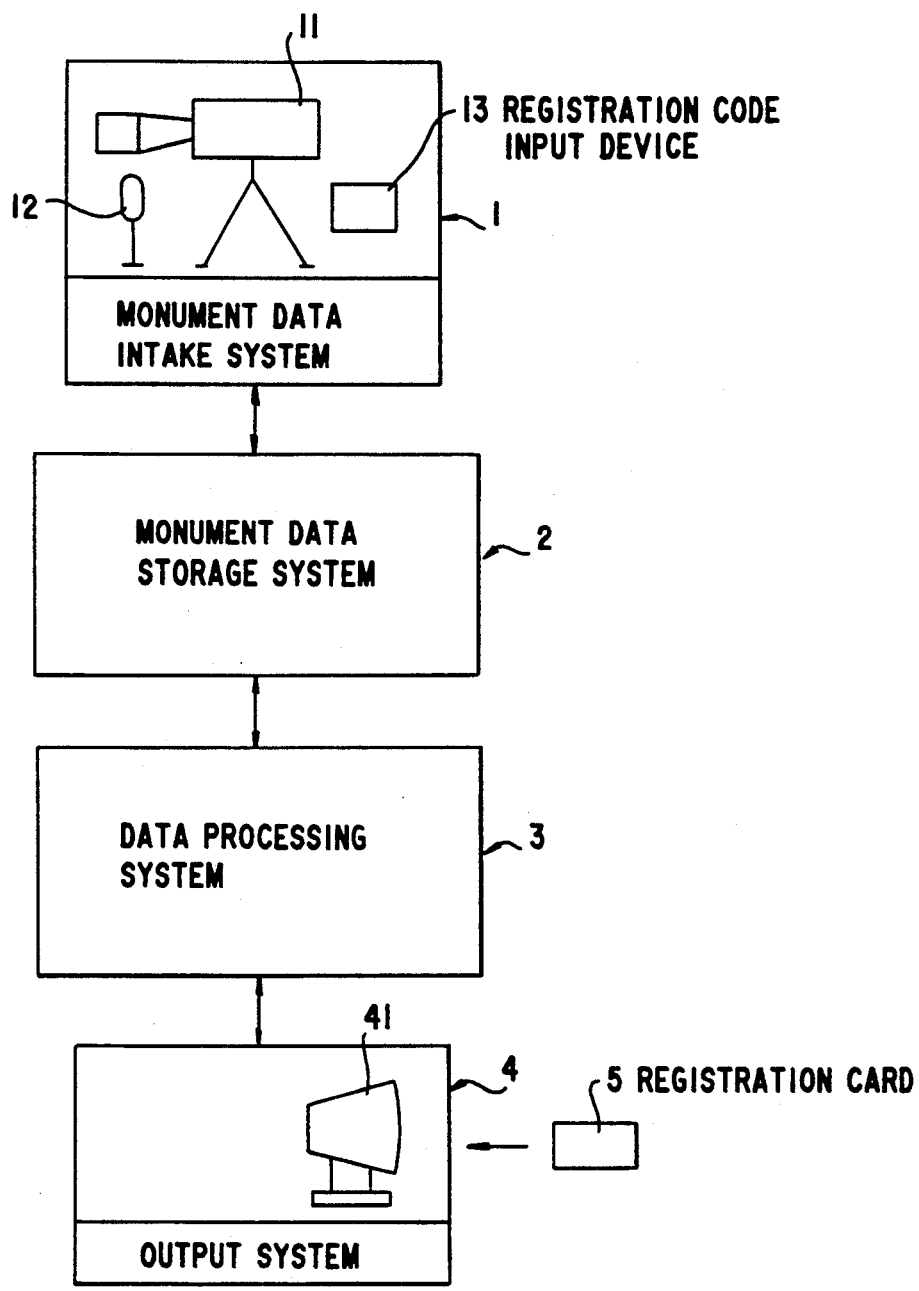
FIG. 1 is a block diagram showing the monument information storage and output device according to the invention.

FIG. 1 is a block diagram of the monument information storage and output system.

The device of the present invention comprises a monument data intake system 1, a monument data storage system 2, a data processing system 3 and a data output system 4.

The monument data intake system 1 comprises a photographing means (with or without a sound pickup means) and a registration code input means. Generally, the photographing means includes a video camera 11 and the sound pickup means includes a microphone 12. The registration code input means may be a keyboard. The input may be a sound input or an input from a registration card which is described hereinafter. In the following description, the data prepared by said photographing, sound pickup and register code input means are globally referred to as monument data.

The photographing means mentioned above may comprise a video camera 11, a monitor television unit 14 for simultaneous display of video data from said video camera 11 and a frame memory 15 for selecting an optional image from said video camera 11 and storing it as a still picture. The sound pickup means may comprise a microphone 12 and a PCM converter 16 for converting sound data from said microphone 12 to pulse code modulation signals. In this case, it may be so arranged that the person who wants to use the device may optionally select a desired still picture or/and sound data, whereupon the intake system 1 outputs the information to the monument data storage system 2 for storage.

The monument data acquired by the monument data intake system 1 is simultaneously sent to the next monument data storage system 2. This monument data storage system 2 comprises a controller for processing the monument data transmitted from the monument data intake system 1 into data which can be easily stored and controlled and storing the data in proper condition and a memory device for storage of thus-processed monument data. In the processing of monument data, the conversion of analog data to digital data is the usual procedure but such conversion need not necessarily be performed.

The controller mentioned above may for example be a medium-sized computer. The memory employs a recording medium such as an opticomagnetic disk, an optical disk (laser disk), a magnetic disk, a magnetic tape or a magnetic drum. Among these memory media, an opticomagnetic disk is preferred in terms of memory capacity and the speed of access. The opticomagnetic disk is a memory medium comprising a magnetically oriented layer formed on a substrate board. As a laser beam under the influence of a magnetic field is projected against the board, the magnetism at the point of light incidence is reversed to store the data. Since this system permits data rewriting and has a large memory capacity, it is most suited for the purposes of the invention which must store a huge quantity of data.

This monument data storage system 2 stores a set of monument data equivalent to each data unit (the monument data obtained per recording by the monument data intake system 1) using the input registration code as an index.

The data processing system 3 is a system for retrieving the monument data from the monument data storage system 2 and transmitting the same to the output system 4 and its cardinal part is comprised of a large computer. This large computer comprises input and output means, a main memory, an external memory and controllers in charge of data transmission among them, and serves as an intermediary between said monument data storage system (2) and said output system 4 which is described in detail hereinafter.

The command specifying which monument data is to be retrieved is transmitted in the reverse order from the output system 4 and the specified monument data is searched for and taken out from a memory within said monument data storage system 2. The retrieved monument data is transmitted to the next output system 4.

The output system 4 is a system for displaying the desired monument data stored in the monument data storage system 2 and comprises an output device 41 and an input device with which a registration number specifying the desired monument data can be entered. The output device 41 may for example be a cathode-ray tube.

The registration code is generally entered as a magnetic signal into a registration card. This registration card is previously issued to a user and the latter can have access to desired monument data using this registration card. A card reader is generally used for entry of a registration code.

The output device 41 is provided in a bank of plural units. Therefore, a plurality of users may receive monument data storage and output services according to the invention.

The operation of the device according to the invention is now described. For use of this device, a user receives a registration card carrying his own registration code. The preparation of this card is performed outside the monument data storage and output device of the invention. To use the device, the user first inputs the registration code of his card by a predetermined procedure. Then, he stands in front of the video camera 11 of the monument data intake system 1 and has himself photographed. At this time, he may enunciate remarks towards the microphone 12.

The picture image data and sound data thus entered are transmitted together with the user's registration code to a monument data input controller 21 of said monument data storage system 2. The monument data storage system 2 transforms the received monument data into a form suitable for storage and transmits it to the memory device. The memory device of the monument data storage system 2 fetches an address corresponding to the registration code and stores the monument data at that address.

To output the stored monument data, the registration code of the registration card is entered into the output system 4. Thereupon the registration code is read and the monument data corresponding to the registration code is called from the monument data storage system 2 and displayed on the cathode-ray tube, with a simultaneous output of the corresponding voice.

In this connection, the data processing system 3 first allocates to the memory device an address corresponding to the monument data at input and, in association with the controller of the monument data storage system 2 stores the input monument data at the designated address of the memory device. To retrieve the stored monument data, the system 3 decodes the registration code inputted from the output system 4, searches the corresponding address, retrieves the specified monument data and transmits it to the output system 4.

As the device of the invention operates as above, the user who once input a monument data can at any time retrieve the data as a picture or a picture-and-voice combination by inputting his own registration code. The following examples are further illustrative of the present invention.

EXAMPLE 1

Figure 2:
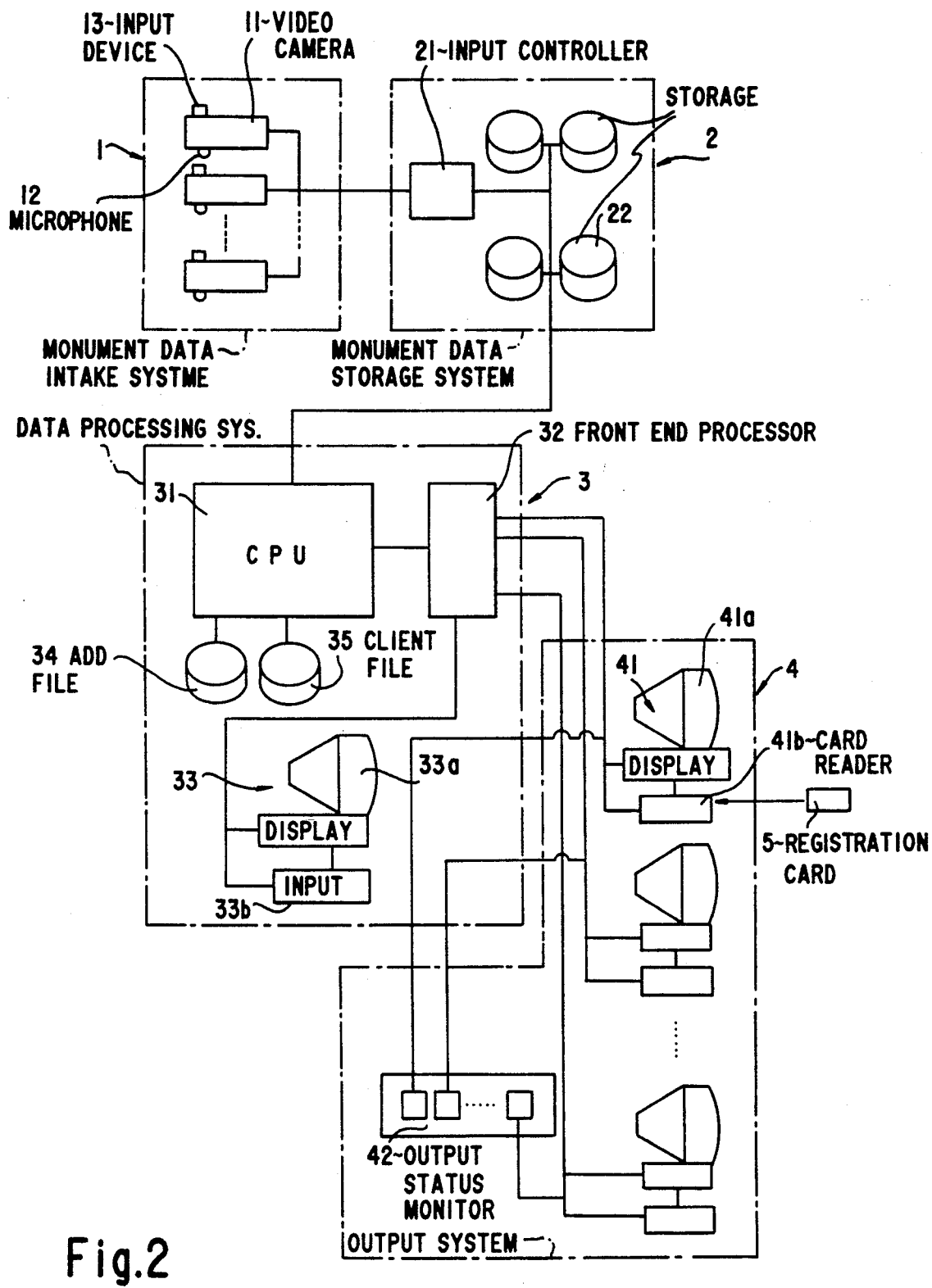
FIG. 2 is a block diagram showing an embodiment of the monument information storage and output device according to the invention.

Referring to FIG. 2 which is a block diagram showing an embodiment of the invention, the monument data intake system is generally indicated by 1, the monument data storage system by 2, the data processing system by 3 and the output system by 4.

Monument Data Intake System 1

The monument data intake system 1 is adapted to receive monument information consisting of picture data or/and sound data and registration data and comprises a video camera 11, a microphone 12 and a registration code input device 13.

The video camera 11 electrically scans a photographed picture image, transforms the shades and hues of minute areas of the image into the corresponding electrical signals and outputs the signals to the next stage. The electrical signals are stored in the monument data storage system 2, which is described in detail hereinafter, for use as picture data. It should be understood that while the ordinary video camera photographs a dynamic series of scenes, the video camera in the present invention photographs a selected scene as a still picture for use as the picture data.

The sound picked up by the microphone 12 is also transmitted to the next monument data storage system 2 for storage as sound data.

The registration code input device 13 is a card reader equipped with a keyboard. As a previously fabricated registration card 5 is entered into this registration code input device 13, the registration code on this card is read and transmitted to the next monument data storage system 2. Since the registration code input device 13 is provided with a keyboard as mentioned above, the photographing date, photographer's name, his comments and other bibliographic data can be entered within allowable limits at this keyboard. These data are collectively dealt with as registration data.

The inputting of these various data is performed in the order of registration data input by the registration code input device 13 and the subsequent simultaneous picture image and sound data input. In this manner, the picture image and sound data are packaged under the particular registration data and transmitted as a unit to the monument data storage system 2.

The registration code in the registration data later plays the important role of a keyword in the outputting of monument data.

Monument Data Storage System 2

The monument data storage system 2 comprises a monument data input controller 21 and an optiomagnetic disk 22 which is a memory device.

The monument data input controller 21 is comprised of a medium computer and transforms the monument data from said monument data intake system 1 into electrical signals which can be easily stored in the opticomagnetic disk 22 within the system and, in association with a central processing unit 31 of the data processing system 3, which is to be described later, designates an address at which the monument data is to be stored on the opticomagnetic disk 22. In this operation the input registration code is referred to and an address corresponding to the code is designated. The above transformation of electrical signals is a conversion of analog data to digital data.

These operations are performed in accordance with a control program previously loaded into the monument data input controller 21.

The memory device used is an opticomagnetic disk 22 as mentioned above. Since a huge number of picture data must be stored in the present invention, an unusually large memory capacity is required. Therefore, the opticomagnetic disk meeting the requirements is employed. The memory density of an opticomagnetic disk is as high as $10^7$–$10^8$ bits per $cm^2$ (100 times the capacity of the ordinary magnetic disk) and, therefore, this type of disk is very suited for these applications.

Data Processing System 3

The data processing system 3 comprises a central processing unit 31, a front-end processor 32 and a maintenance device 33.

The central processing unit 31 constitutes the essential part of the computer and discharges a variety of controlling functions according to an input program. As one of such functions, in storing input monument data into the opticomagnetic disk 22, the central processing unit 31 in cooperation with the monument data input controller 21 determines an address on the opticomagnetic disk 22 by reference to the registration code and instructs it to the monument data input controller 21. In accordance with this instruction, the monument data input controller 21 stores the input monument data at the designated address.

On the other hand, as the registration code functioning as a command for outputting the monument data is transmitted from the output system 4 which is described hereinafter, the central processing unit 31 referring to the registration code searches through the opticomagnetic disk 22 to find the address and commands the monument data input controller 21 for data retrieval. The monument data input controller 21 in response takes out the monument data corresponding to the registration code from the opticomagnetic disk 22 and transmits it to the output system 4 through the central processing unit 31 and front-end processor 32.

Disposed externally of the central processing unit 31 is an address file 34 which is comprised of an ordinary magnetic disk. Stored in this address file are the registration code and the address of the opticomagnetic address in correspondence and the central processing unit 31 uses this address file 34 in the assignment or search of an address.

Indicated at 35 is a client data file comprised of a magnetic disk like that for the address file. Stored in this client data file are the user (client)'s address and name, input date and other bibliographic data in corresponding with the registration code.

The front-end processor 32 is a processing device with security functions which is interposed between the central processing unit 31 and the user (client). This processor has the function of dealing with communication errors within the system and that of disenabling free access to the central processing unit depending on the registration card 5 in the possession of the user. To be specific, this is accomplished by providing a prohibition gate for not accepting information other than the information stored in said client data file 35.

The maintenance device 33 is provided for the maintenance and upkeep of the data processing system 3 and comprises a display 33a, which is an output device, and a maintenance input device 33b which is comprised of a keyboard.

Inputting of data necessary for maintenance is entered from said maintenance input device 33b, while the output is displayed on said display device 33a. It is also possible to monitor through this display 33a whether the system is operating properly or not.

Output system 4

The output device 4 outputs the picture image data from the data processing system 3 in the visually recognizable form and comprises a plurality of output devices 41 and an output monitor 42 for monitoring the output status.

Each output device 41 comprises a display unit 41a having a cathode-ray tube and a card reader 41b for reading the registration code from a registration card 5. The display unit 41a has a sound output function as well.

All that is necessary to output the monument data is to insert the corresponding registration card 5 into the card reader 41b. The card reader 41b reads the registration code from the inserted card and inputs it to the data processing system 3. The data processing system receiving the registration code information performs the necessary processing to select the monument data corresponding to said registration code and outputs a picture image on the display device 41a with or without a sound output.

EXAMPLE 2

Figure 3:
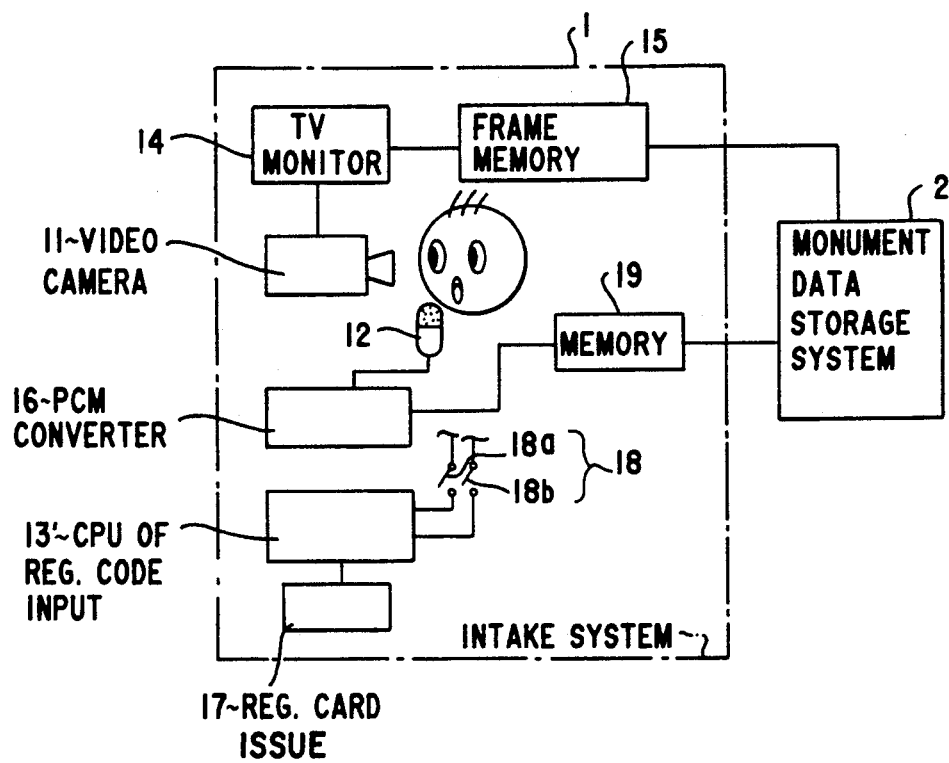
FIG. 3 is a block diagram showing another embodiment of the monument data intake system.

FIG. 3 is a block diagram showing another monument data intake system according to the present invention. As the photographing means within this monument data intake system 1, a TV monitor 14 and a frame memory 15 are interposed between the video camera 11 and the monument data storage system 2. The TV monitor 14 is a dynamic picture output device capable of displaying a picture taken by the video camera 11 and the frame memory 15 picks up a selected scene from the dynamic series of scenes as a still picture, displays it on the TV monitor 14 and, in response to a switching procedure described hereinafter, inputs it into the next monument data storage system 2.

Furthermore, a PCM converter 16 is used as part of the sound pickup within the monument data intake system 1. This PCM converter 16 is a device which does not input sound data as analog data but converts it into a pulse code modulation signal (a sort of digital information). The pulse code modulation signal from the PCM converter 16 is fed through a memory 19 to the monument data storage system 2. The use of this PCM converter results in savings on memory capacity.

The selection of a still picture and the transmission of sound data to said memory 19 are controlled by a control CPU (13') built into the registration code input system 13. The user can operate a switch 18 to select a desired picture. A start switch 18a is used in selecting a still picture and is of the reversal type. Indicated by 18b is a confirmation switch which is closed when the selection has been established.

Thus, the user watching the TV monitor 14 selects a desired picture image and presses the start switch 18a, whereupon the selected picture is entered as a still picture into the frame memory 15. This still picture is displayed on the TV monitor 14. As the user presses the start switch 18a again, the still picture is changed to the usual dynamic picture because the switch 18a is a reversal switch.

After the above procedure is repeated to select the desired still pictures, the user presses the confirmation switch 18b, whereby the still pictures are established, outputted to the monument data storage system 2 where they are stored. This storage is actually performed by a video disk recorder (VDR) within the monument data storage system 2.

Furthermore, since it is so arranged that sound data can be inputted for a certain time period as the confirmation switch 18b is pressed, the verbal comment pertinent to the still picture can be stored together with the still picture within said VDR.

Indicated by 17 is a registration card issuing device which performs a predetermined procedure and issues a registration card 5 to the user.

It should be understood that whereas the device of the invention has so far been described for recording and outputting of both video and sound signals, it may be so arranged that only one of them, particularly video signals, are recorded and outputted.

As described hereinbefore, the monument information storage and output device according to the present invention comprises a monument data intake system for inputting picture (and sound) information and a registration code as a monument data package, a monument data storage system 2 for storing the input monument data package, a data processing system 3 for controlling the input and output of the data, and an output system 4 for reconstructing the stored monument data and displaying the reconstructed information. It is so arranged that the picture information entered into said monument data intake system is stored in a large-capacity memory medium such as an opticomagnetic disk and the input and output control of the data is performed by a large computer. Therefore, the user can enter a registration code at will to obtain monument information mainly composed of the desired picture image.

Having the above construction, the device can be used for a variety of purposes but is particularly suited for use as a monument device at beauty spots. Thus, when this device is installed in a place frequented by sightseers, the visitor can input a souvenir picture in an instant and moreover can preserve it semi-permanently. If one brings a registration card with himself, he can obtain an output at any time.

Monuments are generally made of stone or other heavy structural members, occupy large areas and, therefore, cannot be installed at will. However, by using the device of the invention, such monuments can be made available to all.

This device not only helps fulfil the inherent desire of man to leave oneself in some form or other after death but also contributes to tourist industry.

Furthermore, the device of the invention can be used as a device for visualization and confirmation of video information in a common file by a large number of persons.

In addition, since the device of the invention allows the user to select and preserve monument information within his own discretion, the superfluous parts may be omitted so that an efficient utilization of the memory device can be realized.

What is claimed is:

1. An input, storage and output device for intake and storage of monument information for subsequent retrieval and output of monument information comprised of registered picture data or both registered picture and registered sound data comprising:
    a monument data input system including
        (i) photographing means for video information or both photographing means for video information and sound pickup means for sound information and
        (ii) registration code input means for entering registration codes, said monument data input system being provided with a start switch in selecting a still picture and a confirmation switch for establishing said still picture,
    a monument data storage system for storing the monument data transmitted from said monument data input system by corresponding registration code,
    a data processing system for controlling the input and output of the monument data stored by registration code in said monument data storage system, and
    an output system for referring to a selected one of said registration codes and outputting the monument data corresponding to said selected code.

2. A monument information input, storage and output device for outputting monument information comprised of registered picture data or both registered picture data and registered sound data which comprises;
    a monument data input system including;

(i) photographing means for video information or both photographing means for video information and sound pickup means for sound information and (ii) registration code input means for entering registration codes, a monument data storage system for storing the monument data transmitted from said monument data input system by corresponding registration code, a data processing system for controlling the input and output of the monument data stored by registration code in said monument data storage system, and an output system for referring to a selected one of said registration codes and outputting the monument data corresponding to said selected code; wherein:

said photographing means in said monument data input system comprises a video camera and a TV monitor for displaying a video image from said video camera and a frame memory for selecting a given picture output from said video camera and storing it as a still picture; and said sound pickup means comprises a microphone and a PCM converter for converting sound data from said microphone to pulse code modulation signals; whereby a desired still picture or a desired still picture and a desired sound data as selected by a user is outputted to said monument data storage system for storage.

3. The device according to claim 1, wherein said monument data storage system further comprises a monument data input controller and an optiomagnetic disk.

4. The device according to claim 1, wherein said monument data storage system further comprises a video disk recorder (VDR).

5. The device according to claim 1, wherein said monument data input system further comprises a frame memory.

6. The device according to claim 2, wherein said monument data storage system further comprises a monument data input controller and an optiomagnetic disk.

7. The device according to claim 2, wherein said monument data storage system further comprises a video disk recorder (VDR).

8. A method for storing monument information using a device having:

a monument data input system including;

(i) photographing means for video information or both photographing means for video information and sound pickup means for sound information, (ii) registration code input means for entering registration codes, and (iii) a start switch for selecting a still picture and a confirmation switch for establishing said still picture;

a monument data storage system for storing the monument data transmitted from said monument data input system by corresponding registration code, a data processing system for controlling the input and output of the monument data stored by registration code in said monument data storage system, and an output system for referring to a selected one of said registration codes and outputting the monument data corresponding to said selected code; wherein:

said photographing means in said monument data input system comprises a video camera and a TV monitor for displaying a video image from said video camera and a frame memory for selecting a given picture output from said video camera and storing it as a still picture; and said sound pickup means comprises a microphone and a PCM converter for converting sound data from said microphone to pulse code modulation signals;

said method comprising the steps of:

watching said TV monitor to select a desired picture image, operating said start switch to enter the selected picture as a still picture into the frame memory, operating said confirmation switch to store the still picture to the monument data storage system, optionally inputting sound data to store verbal comments together with the still picture for a certain time period during which the confirmation switch is pressed.

* * * * *